United States Patent
Hu et al.

(10) Patent No.: US 8,934,890 B2
(45) Date of Patent: Jan. 13, 2015

(54) TRANSMISSION OF DATA BURSTS ON A CONSTANT DATA RATE CHANNEL

(75) Inventors: Chunhua Hu, Plano, TX (US); Jelena Nikolic-Popovic, Ottawa (CA); Dave Allan Comisky, St. Charles, IL (US); Bradley Wayne Caldwell, St. Charles, IL (US)

(73) Assignee: Texas Instruments Incorporated, Dallas, TX (US)

( * ) Notice: Subject to any disclaimer, the term of this patent is extended or adjusted under 35 U.S.C. 154(b) by 1288 days.

(21) Appl. No.: 12/339,035

(22) Filed: Dec. 18, 2008

(65) Prior Publication Data
US 2009/0181663 A1 Jul. 16, 2009

Related U.S. Application Data

(60) Provisional application No. 61/020,443, filed on Jan. 11, 2008.

(51) Int. Cl.
| | |
|---|---|
| H04W 74/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| G06F 3/00 | (2006.01) |
| G06F 5/00 | (2006.01) |
| H04W 4/00 | (2009.01) |
| H04W 72/00 | (2009.01) |
| H04L 12/861 | (2013.01) |
| H04W 28/22 | (2009.01) |

(52) U.S. Cl.
CPC ............ *H04L 49/9031* (2013.01); *H04L 49/90* (2013.01); *H04W 28/22* (2013.01)
USPC .......... 455/422.1; 370/230; 370/252; 710/52; 455/452.1; 455/455

(58) Field of Classification Search
CPC .... H04W 28/14; H04W 28/22; H04L 1/1874; H04L 49/9031; H04L 49/90; G06F 17/3074; G06F 2003/0691–2003/02
USPC ............ 455/422.1, 452.1, 455, 515; 709/231; 711/154; 710/52; 370/230, 252
See application file for complete search history.

(56) References Cited

U.S. PATENT DOCUMENTS

| | | | | |
|---|---|---|---|---|
| 5,603,058 | A | * | 2/1997 | Belknap et al. .................. 710/35 |
| 5,734,903 | A | * | 3/1998 | Saulpaugh et al. ........... 719/316 |

(Continued)

OTHER PUBLICATIONS

Lanzani, "OBSAI RP3-01 6.144 Gbps Interface Implementation", FPGAworld.com, 2007, pp. 1-7.

(Continued)

*Primary Examiner* — Dwayne Bost
*Assistant Examiner* — Larry Sternbane
(74) *Attorney, Agent, or Firm* — Robert D. Marshall, Jr.; Frederick J. Telecky, Jr.

(57) ABSTRACT

A system and method for transmitting data bursts over a constant data rate link that transmits a continuous stream of data is disclosed. A transmitter node accesses a region in a memory to form a continuous stream of data, wherein the region is a circular buffer and is accessed in a circular manner. The continuous stream of data is transmitted from the circular buffer, wherein the circular buffer initially contains dummy data. A data burst is stored in the circular buffer at a selected location and a control message is transmitted with an indication of the selected location of the data burst in the circular buffer. The data burst is transmitted as part of the continuous stream of data from the circular buffer.

8 Claims, 8 Drawing Sheets

(56) References Cited

U.S. PATENT DOCUMENTS

| | | | |
|---|---|---|---|
| 6,476,653 B1* | 11/2002 | Matsuzaki | 327/158 |
| 7,890,834 B2* | 2/2011 | Blankenship et al. | 714/755 |
| 2007/0083695 A1* | 4/2007 | Aull et al. | 710/310 |
| 2008/0141180 A1* | 6/2008 | Reed et al. | 715/854 |

OTHER PUBLICATIONS

Texas Instruments, "TMS320TCI6487/8 Antenna Interface User's Guide", Literature No. SPRUEF4A, Dec. 2006 (Revised Jun. 2007), pp. 1-294.

* cited by examiner

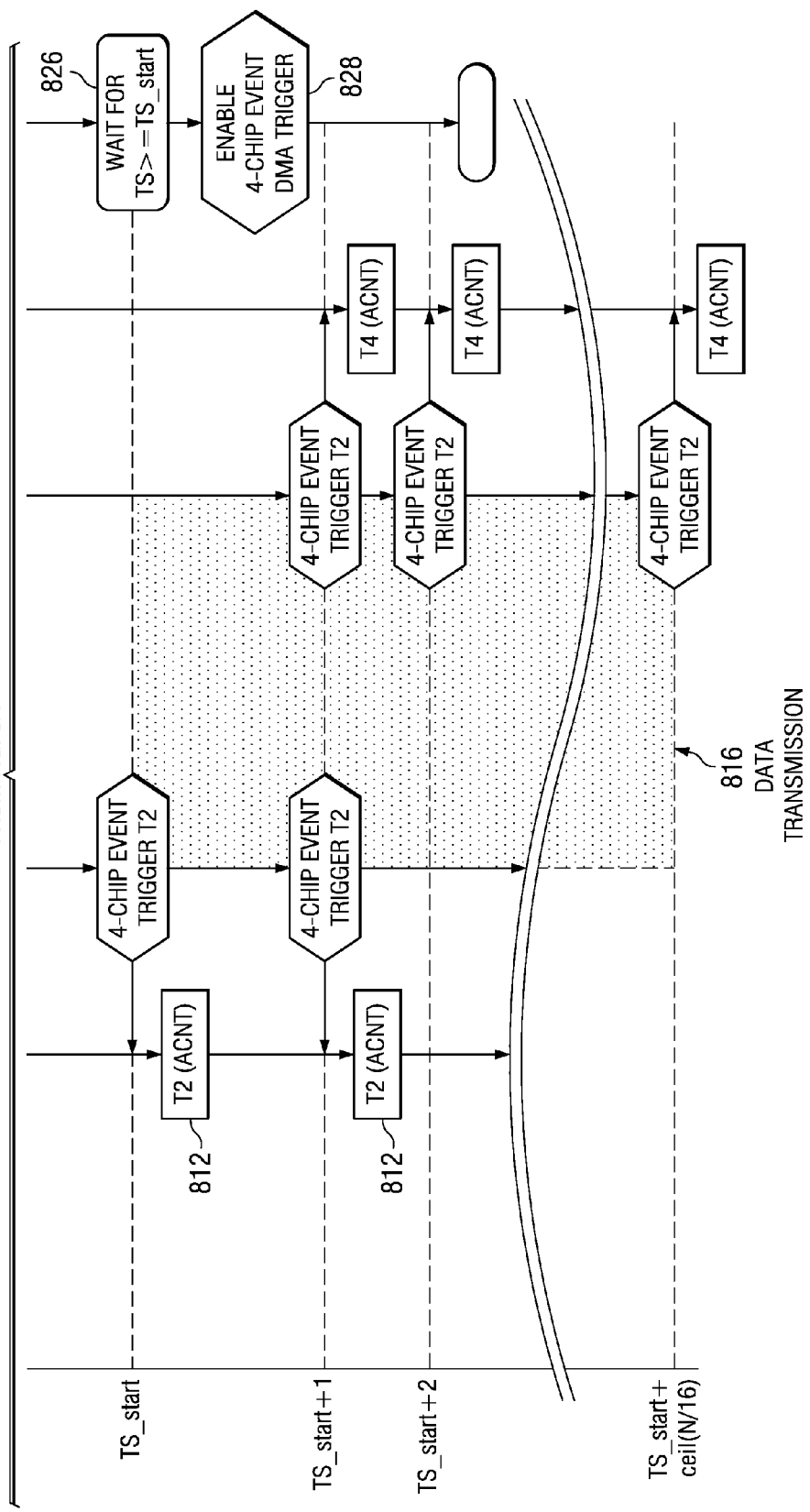

US 8,934,890 B2

TRANSMISSION OF DATA BURSTS ON A CONSTANT DATA RATE CHANNEL

CLAIM OF PRIORITY

This application for Patent claims priority to U.S. Provisional Application No. 61/020,443 entitled "Packet-Oriented Point-to-Multipoint Inter-processor Communication over OBSAI RP3/CPRI Compliant Antenna Streams" filed Jan. 11, 2008, which is incorporated by reference herein.

FIELD OF THE INVENTION

This invention generally relates to transmission of packet data via a channel that is not designed to handle packet data.

BACKGROUND OF THE INVENTION

Digital systems are generally constructed by interconnecting generic and specialized integrated circuits that often include one or more digital computer processors. Software is developed for execution by the processors for controlling the system. For example, wireless cellular communication networks have a base station located in each cell of the network. A base station consists of a baseband processing subsystem and a radio transceiver.

The baseband processing subsystem of a base station's electronics is typically constructed using standardized integrated circuits that include processors, memory and various communication interface circuits. The base station requires high bandwidth transmission paths between the baseband processing subsystem and the radio transceivers. For this reason, standardized parts have been developed that include several high speed channels for transferring antenna IQ (in-phase and quadrature) data via constant data rate channels.

A working group referred to as Open Base Station Architecture Initiative (OBSAI) has promulgated several standards with a goal to create an open market for base station components.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
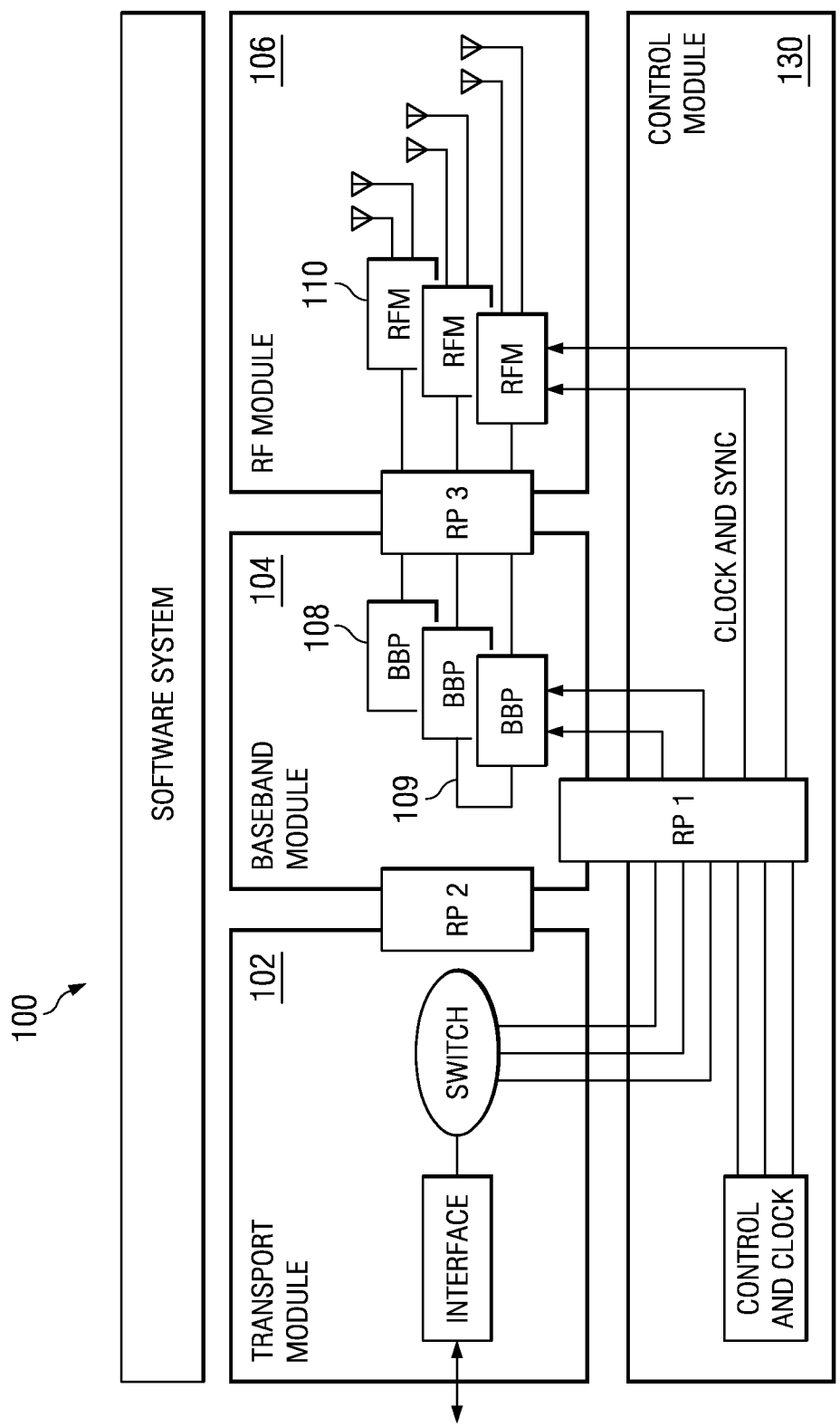
FIG. 1 is a pictorial of an illustrative base station that employs an embodiment of data bursts being transmitted via constant data rate channels.

FIG. 1 shows an exemplary base station 100 for use in a telecommunications network. Wireless cellular communication networks incorporate a number of mobile UEs (user equipment) and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable. Each base station 100 in a network is operable over coverage area which may be further divided into cells. Handsets or other user equipment are located within or pass through the various cells of the network. Base station 100 transmits to and receives transmissions from UE within its cell via downlink and uplink transmissions. As a UE moves out of one cell and into another cell, it may be handed over to a different base station serving the next cell. A UE in a cell may be stationary such as within a home or office, or may be moving while a user is walking or riding in a vehicle.

Base station transceiver system 100 is composed of four main components. Radio module 106 receives signals coming from portable devices and down converts it to digital data. Processing module 104 then takes the encoded signal and brings it back to baseband before it is transmitted to the terrestrial network via transport module 102. Coordination between these three functions is maintained by control module 130.

The key objective of OBSAI is to create an open market for BTS components by defining standard interfaces used to connect the four modules described above. In the OBSAI specification, interfaces between modules are known as reference points (RPs). As illustrated in FIG. 1, RP1 is the interface that allows communication between a control module and the other three modules. RP2 provides a link between the transport and baseband modules, while RP3 connects the baseband and radio frequency (RF) modules.

Each baseband processing subsystem, generally indicated at 108, of base station 100 is constructed using a number of specialized processing systems on a chip (SOC) integrated circuits (IC) which each contain multiple processor cores and communication ports, among other things. Radio frequency modules, generally indicated at 110, that transmit and receive the downlink and uplink radio signals are connected to these processors via high bandwidth constant data rate RP3 links for transferring the streams of antenna data. The processing ICs are interconnected to each other for exchanging control information and other data that occurs randomly and takes the form of data bursts rather than continuous data transfers via one or more links, indicated generally at 109.

Typically, the specialized processing SOC has a number of high speed channels designed to handle the antenna stream data thus enabling the SOC to directly connect to the radio subsystem without any further chips. The processing SOC will typically have other types of communication ports also, such as Ethernet and various types of serial ports. However, frequently there is a need to provide more interconnection capability than there are communication ports available on the processing SOC. An efficient method for performing burst data transfers between two or more processing SOC's using one or more of the high speed antenna stream channels will be described in more detail below. In one embodiment, other ports like Ethernet and SRIO are used to communicate to other chips like host processors and coprocessors. At the same time, the antenna interface might not be used to directly connect to the radio subsystem—instead, the SOC would interface to another specialized coprocessor which would in turn interface to the radio subsystem, In this case, the antenna interface is under-utilized and could therefore provide additional bandwidth needed for packet communication among SOCs.

Figure 2:
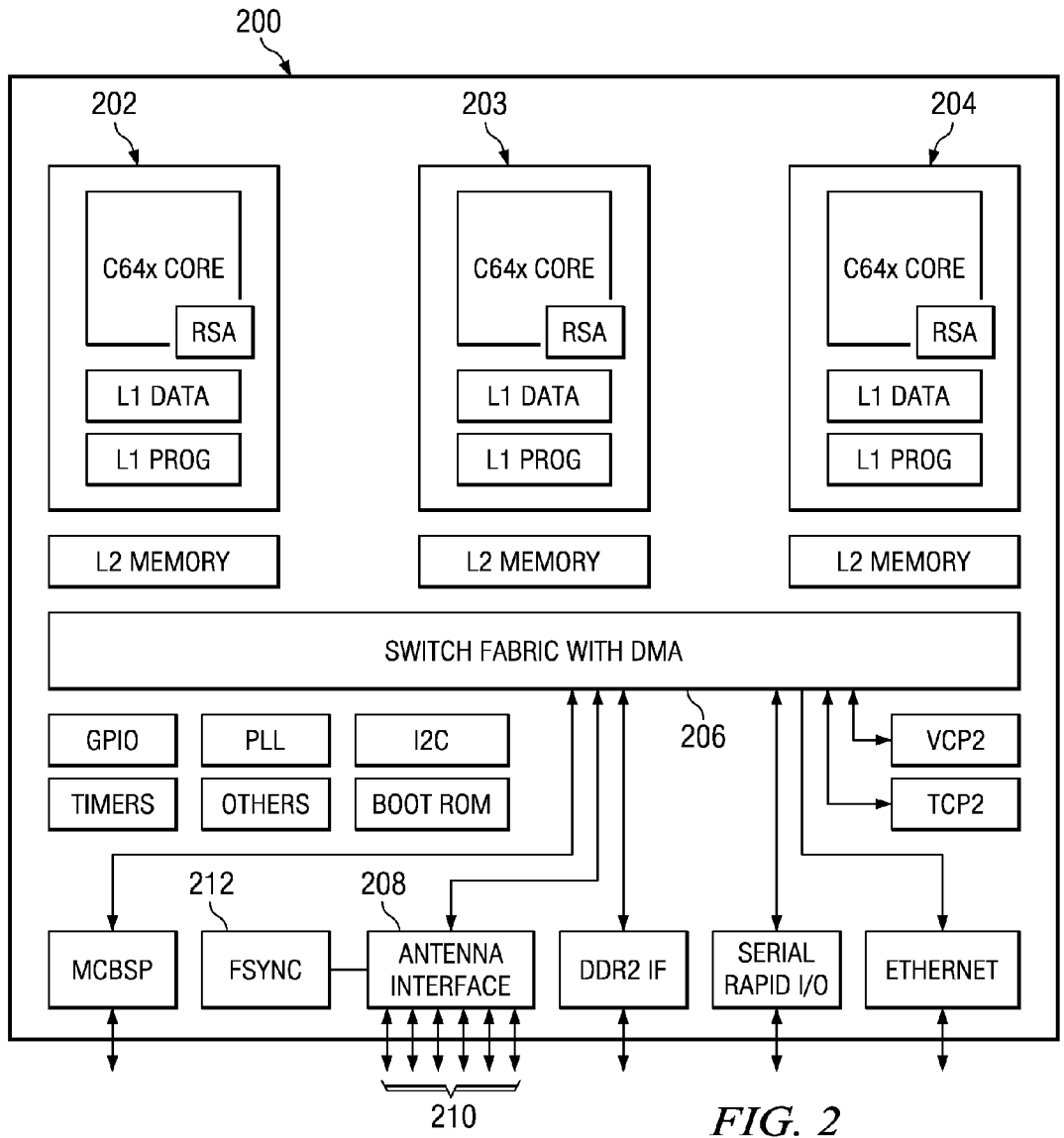
FIG. 2 is a block diagram of an exemplary system on a chip that includes a number of high speed constant data rate channels that may be used for data burst transfers.

FIG. 2 is a block diagram of an exemplary processing system on a chip 200 that includes a number of high speed constant data rate channels 210 that may be used for data burst transfers. For purposes of description, the processing system of FIG. 2 is a Texas Instruments TMS320TCI6487 (TCI6487) Digital Signal Processing (DSP) platform. The TCI6487 device is a very high-performance DSP designed specifically for wireless infrastructure baseband applications. With a high level of functional integration and a high channel density supported on a single device, the TCI6487 DSP offers a modular and scalable design with a small footprint and is therefore an ideal solution for pico, micro and macro BTS and enables an SOC baseband solution for UMTS, TDSCDMA, WiMAX and cdma2000 applications.

SOC 200 has three independent DSP subsystems 202-204. At the heart of each subsystem is a 1.0-GHz C64x+DSP core. For flexibility, the 3 Mbytes of L2 SRAM/cache can be configured in multiple ways, such as 1/1/1 Mbytes, or 1.5/1/0.5 Mbytes, among the three DSP cores. To support wireless applications, the DSP contains a number of specialized coprocessors: Viterbi Decoder Coprocessor (VCP2); Turbo Code Decoder Coprocessor (TCP2); and Rake Search/Spread Accelerator (RSA). The RSA is a tightly coupled coprocessor that can be used to accelerate CDMA chip-rate processing. Another feature of the device is its support of standard interfaces such as: serial RapidIO (SRIO), Gigabit Ethernet, double data rate (DDR2) memory interface, and a multichannel buffered serial port (McBSP). A switch-fabric 206 with direct memory access (DMA) engine supports high-bandwidth, low-latency internal communications. DMA 206 manages communications between peripherals, memories, accelerators and DSP cores within SOC 200.

An antenna interface (AIF) 208 is a CPRI (Common Public Radio Interface) and OBSAI-compliant (Open Base Station Architecture Initiative) peripheral whose primary purpose is to transfer baseband antenna samples, via a high-speed serializer/deserializer (SerDes) interface, between a radio subsystem and a baseband sub-system in cellular infrastructure applications. AIF 208 supports up to six configurable links 210 each at a maximum rate of 3.072 Gbps (OBSAI) and 2.4576 Gbps (CPRI).

In various embodiments, two or more SOC 200 will be interconnected and need to transfer data and control information between them. It may be advantageous to use one of the antenna stream links 210 for this purpose. However, the standard AIF 208 operation is continuously transmitting and receiving data and the timing is strictly controlled by hardware. The nature of inter-DSP data traffic, however, is often asynchronous and bursty, rather than continuous. This type of traffic is best suited for a packet interface like gigabit Ethernet or sRIO, but in some applications, these interfaces are already used for other purposes.

Given the continuous nature of the typical AIF traffic, the easiest approach to implement bursty traffic would be to have the AIF transmitter continuously send dummy data, and insert useful data when there is actually something to send. The receiver would have to periodically check if there is any data available. Given the data rates involved, the polling at the receiver could represent a very high load on the DSP (both the CPU and the internal buses).

In this disclosure, a protocol designed to remove the above mentioned polling overhead at the receiver is described. Rather than having to poll periodically looking for useful data, the receiver is notified by the transmitter, via a special message (called a Start Packet), that a data burst is about to be sent, giving it information about its location (within the OBSAI frame) and size. The receiver then performs necessary setup to be able to extract the data burst from the incoming bit stream.

Once the antenna interface is up and running, data samples are continuously transmitted and received. The AIF peripheral mainly provides buffering capabilities so that no data would be lost. These buffers need to be filled and emptied at a certain rate in order to prevent overflow (losing data) and underflow (reading stale data). The data (typically antenna samples) can consist of multiple streams (or channels, or antenna containers) which are combined on a single physical link in a TDM (time-division multiplexing) manner. In addition to antenna samples, control channels are also supported in the OBSAI interface and are time-division multiplexed with antenna streams in specific reserved locations. The OBSAI protocol defines important timing information which guarantees that the transmitter and the receiver are synchronized. Various timing events which are needed for the AIF are generated by the FSYNC module 212 based on an external clock.

Operation of AIF 208 and the OBSAI frame structure is described in detail in "TMS320TCI6487/8 Antenna Interface User's Guide, Literature Number: SPRUEF4A, December 2006—Revised June 2007" which is incorporated by reference herein. Aspects relevant to embodiments of the current invention will be described in more detail below.

Figure 3:
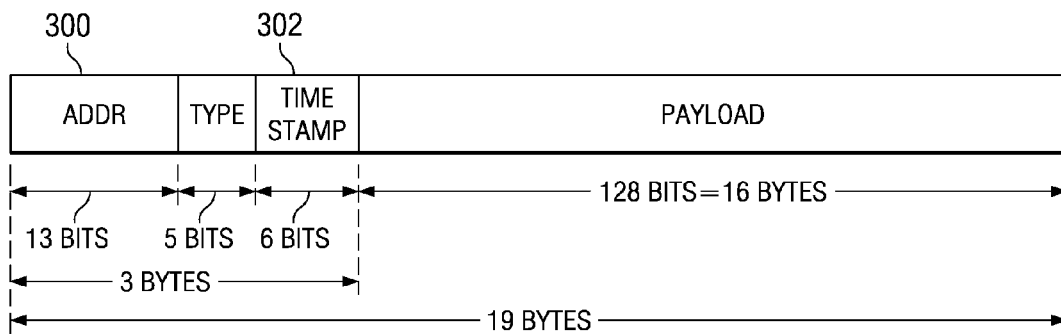
FIG. 3 is a prior art illustration of an OBSAI RP3 protocol packet structure that is used on the constant data rate channels of the system of FIG. 2.

FIG. 3 is an illustration of an Open Base Station Architecture Initiative Reference Point 3 (OBSAI RP3) protocol packet structure that is used on the constant data rate antenna channels 210 of SOC 200. The frame structure in OBSAI is based on a 10 msec master frame which consists of nx768000 bytes of payload, where n is the link rate with n=1, 2 or 4. The master frame is split into message groups, where the number of message groups per master frame also depends on the physical link rate. Each message group consists of 21 messages, denoted M1, M2, ..., M21. Each message consists of 16 bytes of payload and 3 bytes of header. The message is constructed as an RP3 packet 300.

A time stamp 302 is embedded into each OBSAI message and is used to make sure that the transmitter and the receiver are synchronized. This is important for antenna data because each antenna sample needs to be traced back to a particular location in the UMTS (Universal Mobile Telecommunications System) frame hierarchy. The time stamp is set to 0 at each frame boundary. In UMTS systems, the frame duration is 10 msec, and the smallest unit of time is 1 chip period, which is 1/(3.84 Mhz)=260.4 nsec. The time stamp increments once every 4 chip periods, which translates to ~1.04 μsec. The incrementing is done based on counting external clock pulses.

In digital communications, a "chip" is a pulse of a direct-sequence spread spectrum (DSSS) code, such as a pseudo-noise code sequence used in direct-sequence code division multiple access (CDMA) channel access techniques. In a binary direct-sequence system, each chip is typically a rectangular pulse of +1 or −1 amplitude, which is multiplied by a data sequence (similarly +1 or −1 representing the message bits) and by a carrier waveform to make the transmitted signal. The chips are therefore just the bit sequence out of the code generator; they are called chips to avoid confusing them with message bits.

The time stamp is generated and inserted into the message header by AIF transmit hardware. It is also accessible to software executing on the DSP cores via a read-only register.

The time stamp is verified by AIF receive hardware. If the time stamp value contained in the message received from the SerDes link differs from the local time stamp (which is based on the local FSYNC counter), the message is discarded. If the received and the local time stamp are equal, the AIF hardware places the message in the location in the AIF receive buffer (AIF RX RAM) which corresponds to the time stamp. The AIF buffer organization will be discussed with regard to FIG. 4.

The AIF can transfer packet-switched (PS) messages typically used for control, or circuit switched (CS) messages typically used for antenna samples. The OBSAI messages are organized into message groups which contain both data slots and at least one control slot. For example, for a 1x link rate there are twenty-one times slots. Twenty of those time slots are used for data messages, and one is used for a control message.

Packet-switched messages can be sent both through data slots and control slots, however, CS messages can only be transferred through the data slots. This is configured by software via a look-up table. The two types of messages are therefore time-division multiplexed on the SerDes bus, and the above mentioned look up table is used by hardware to decide at which point in time it needs to insert a packet switched message from the packet buffer, vs. a circuit-switched message which comes from the data buffer (AIF TX RAM).

There are multiple FIFOs within AIF 208 which are used for buffering of packet-switched messages: Four receive FIFOs for incoming messages, and thirty transmit FIFOs for outgoing messages. The FIFOs can be programmed to generate an event (CPU or DMA sync) to inform the CPU or DMA engine when a certain number of packets has left/entered the FIFO.

On transmit, the DMA 206 or CPU 202-204 places the control message in the transmit FIFO. It is sent out on the next opportunity (i.e. the next slot configured for a PS message).

On receive, each PS message (payload and header) is placed into RX FIFO and after a (programmable) number of messages have been received, an event is generated which can interrupt the CPU or trigger a DMA transfer.

Figure 4:
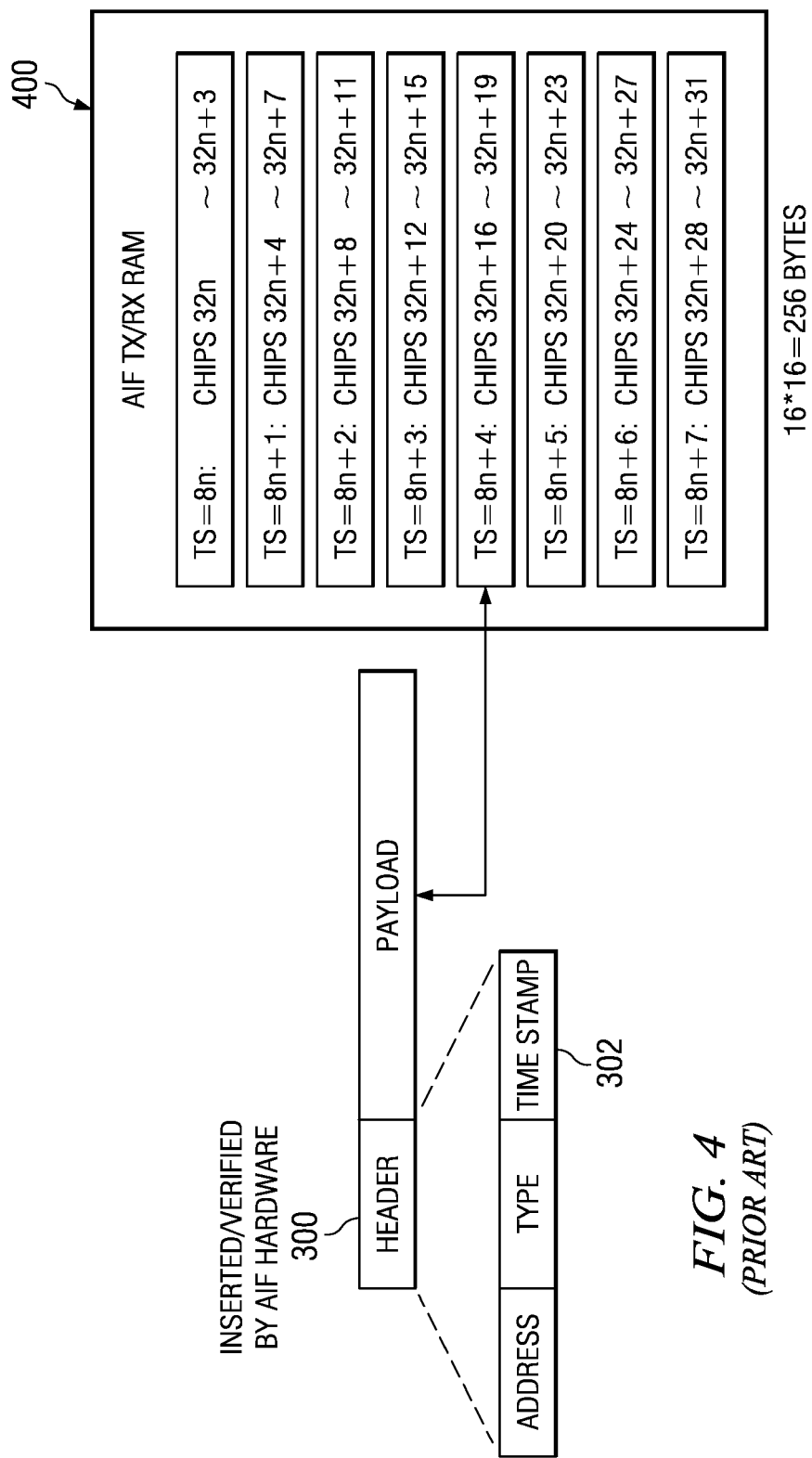
FIG. 4 is a prior art illustration of an exemplary circular buffer area in memory that is used by either a transmitter or a receiver for the high speed channels of the system of FIG. 2.

FIG. 4 is an illustration of an exemplary circular buffer area 400 in memory within AIF 208 that is used by either a transmitter (TX) or a receiver (RX) for the constant data rate channels of AIF 208. AIF TX and RX RAM 400 are used for circuit switched messages. The size of RAM 400 is 2 Kbytes per link. Typically, these memories are accessed via DMA 206. On transmit, the AIF takes data from the TX RAM, inserts the header (including the time stamp) and transmits it over the SerDes 210. On receive, the AIF checks the received time stamp and then places the message at the appropriate place in the AIF RX RAM. Therefore, the location of data in the AIF RAMs is determined by the time stamp at which the data is to be sent or has been received.

From the point of view of AIF 208 and the SerDes link, the AIF RAMs 400 operate like circular buffers. On the receive side, the data is continuously being written into the RX RAM based on the time stamp, and on the transmit side, it is continuously being pulled out of TX RAM based on the time stamp. Therefore, the DSP side needs to be able to stay synchronized with the SerDes operation, i.e. the data needs to be written to the TX RAM at the same rate at which it is pulled out for SerDes transmission, and it needs to be pulled out of the RX RAM at the same rate at which it is being written to by SerDes. This is accomplished via synchronized DMA transfers. For each synchronization event, one time stamp worth of data (16 antenna streams, 16 bytes each) is transferred. Therefore, a synchronization event is used which is generated once per time stamp increment, or once every four chips. The role of the CPU is merely to setup the FSYNC and DMA prior to activating the AIF link, and (optionally) to respond to DMA transfer completion interrupts.

The synchronization events used by DMA 206 to synchronize accesses to the AIF RAMs between the DSP/DMA side and AIF/SerDes side are generated by the FSYNC module 212. In simplified terms, the FSYNC generates its events based on counting the FSYNC clock input pulses. The smallest transmission interval in the UMTS systems is one chip period, or 1/(3.84 MHz). To allow for timing alignment and offset compensation between the transmitter and the receiver, the FSYNC module actually counts sub-chips (⅛th of chip duration).

Due to the relationship between the time stamps and AIF RAM storage described above, the FSYNC event which is of interest for embodiments of the present invention is the 4-chip event that is generated once every time stamp increment, or approximately once every 1 μsec.

As described above, OBSAI PS (packet switched) mode would be a natural candidate for inter-DSP communication, due to the availability of FIFO receive interrupts, but the bandwidth limitation to about 1-2 Gbps means that the AIF can only be utilized at a fraction of its capabilities. On the other hand, OBSAI CS mode is exactly the opposite of "bursty" and "asynchronous" communication: it is running continuously, and inserting bursty data into a continuously running stream of dummy data can potentially present high overhead: (1) The DMA needs to be emptying receive buffers (AIF RX RAM) continuously, and (2) the CPU needs to be checking the contents of received buffers continuously, and potentially discarding them most of the time.

An embodiment of the present invention uses a "hybrid PS/CS" mode, in which the transmitter first sends a special message which is referred to herein as the "start packet" with the information about the location of the upcoming data burst. The start packet is transmitted as a PS message, followed by the actual data burst which is transmitted as a contiguous block of CS messages.

The advantage of sending the start packet as a PS message in this context is that, on the receiving side, an event can be generated as soon as the packet arrives in the receive FIFO, which can interrupt the CPU. This is one of the few asynchronous mechanisms provided by the AIF.

Figure 5:
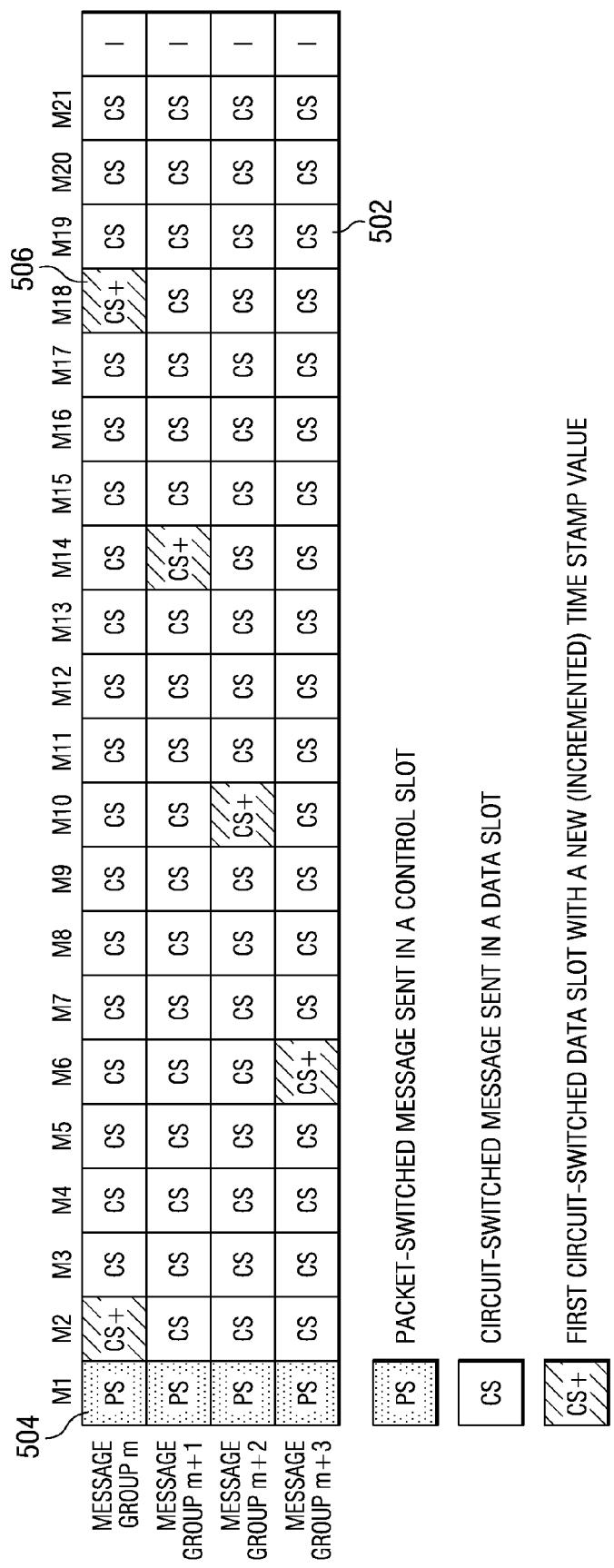
FIG. 5 is an illustration of message slot assignments for the constant data rate channels of the system of FIG. 2.

FIG. 5 is an illustration of message slot assignments for the AIF antenna stream channels. Eighty four slots, indicated generally at 502 are illustrated, corresponding to 4/2/1 message groups, for a 1x/2x/4x AIF link rate, respectively. It should be understood that the message groups are transmitted continuously as a stream, as described above. The location of each PS message within a message group is indicated generally at 504. It is the first message slot in each message group. This slot is configured as a control slot.

Each of these control slots represents an opportunity for sending the Start Packet, and each of the CS slots at which the time stamp increments, denoted "CS+ and indicated generally at 506, represents an opportunity for starting the transmission of a data burst.

Figure 6:
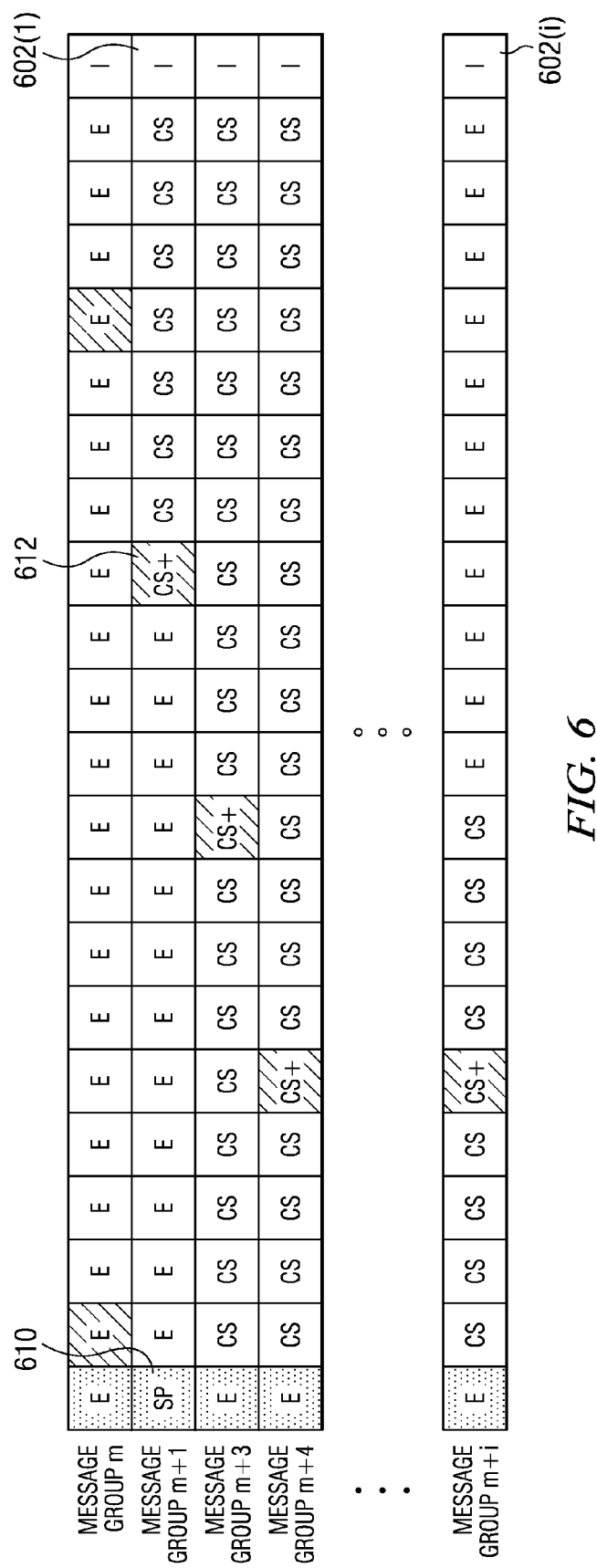
FIG. 6 is an illustration of data burst transmission being performed over the constant data rate channels of the system of FIG. 2.

FIG. 6 is an illustration of data burst transmission being performed over the constant data rate channels of AIF 208. Start Packet 610 is sent in the first slot of Message Group (m+1) 602(1), and the data burst transmission starts in slot fourteen, indicated at 612, of Message Group (m+1), which is when the time stamp increments. The data transmission finishes in message group (m+i) 602(i), where i is a function of the burst length and can be variable. Each message slot indicated with "E" carries extraneous data that was in the TX RAM prior to the current data burst transfer. This extraneous data is ignored and discarded by the receiver. Extraneous data is also referred to herein as "dummy data" to indicate stale or initial data that is present in the TX RAM which may get repeatedly transmitted as part of the continuous stream of data between data bursts. Dummy data is discarded by the receiver.

In practice, it is also possible that the transmission of the data burst may start before the start packet is transmitted, depending on when the next configured control slot falls relative to the time stamp increment slot. This will not prevent the data from being received correctly because the AIF RX RAM stores eight time stamps worth of information and the DMA should have enough time to pull the data out of the AIF RX RAM prior to it being overwritten by new data, eight time stamps later.

Figure 7:
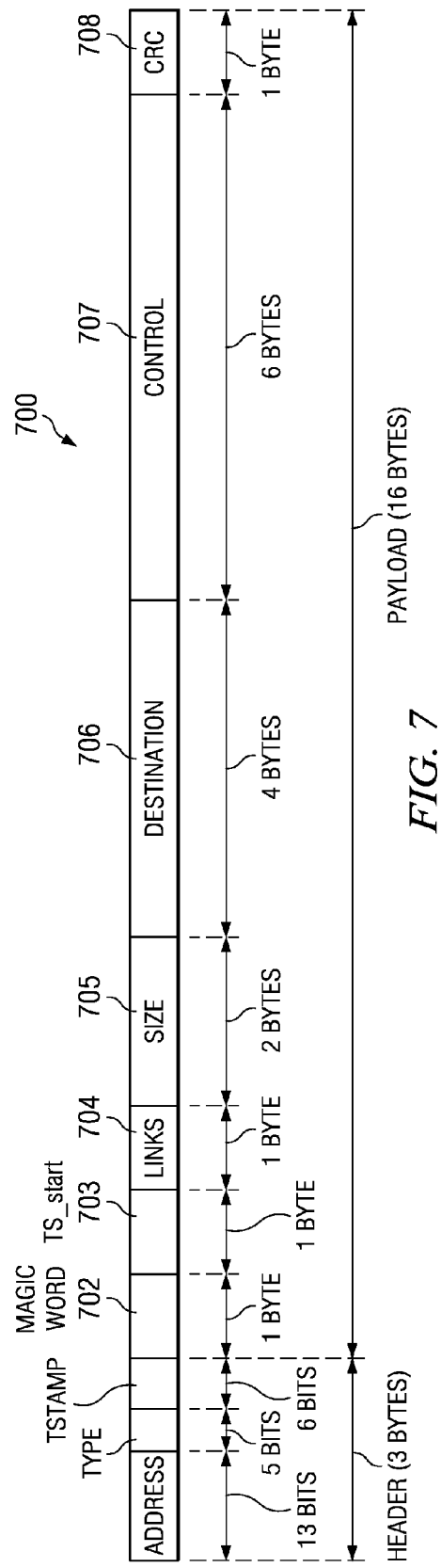
FIG. 7 is an exemplary control message for indicating the start of a data burst.

FIG. 7 is an exemplary control message 700 for indicating the start of a data burst. The start packet contains, at a minimum, information about where in the continuous stream the data burst transmission starts, as well as the length of the data burst. This information is used at the receiver to program DMA transfer parameters to transfer the data burst from AIF RX RAM to DSP memory (internal or external).

Since the start packet is simply a message sent in a control slot, it has a sixteen byte payload. Therefore, additional information can also be sent, such as control data and CRC (cyclic redundancy check). The fields in the exemplary start packet are as follows. Magic Word 702 (1 byte) denotes the start of a valid start packet. In this embodiment, the value is selected to be 0x5A. TS_start 703 (1 byte) and Links 704 (1 byte) specifies the location of the start of the data burst in AIF RAM, as described with regards to FIG. 4. Size 705 (2 bytes) indicates the number of 16-byte blocks. If the size is 0, then this could be just a control message (no data). Destination 706 (4 bytes) can be either a DSP memory address, or a mailbox ID, similar to message passing in sRIO. Control 707 can be used by the application to send ACK/NACK or other control messages with or without sending the data. CRC 708 (1 byte) can be implemented for protection against SerDes transmission errors. A higher-level ACK/NACK protocol can be initiated in case of a failed CRC check.

Figure 8A:
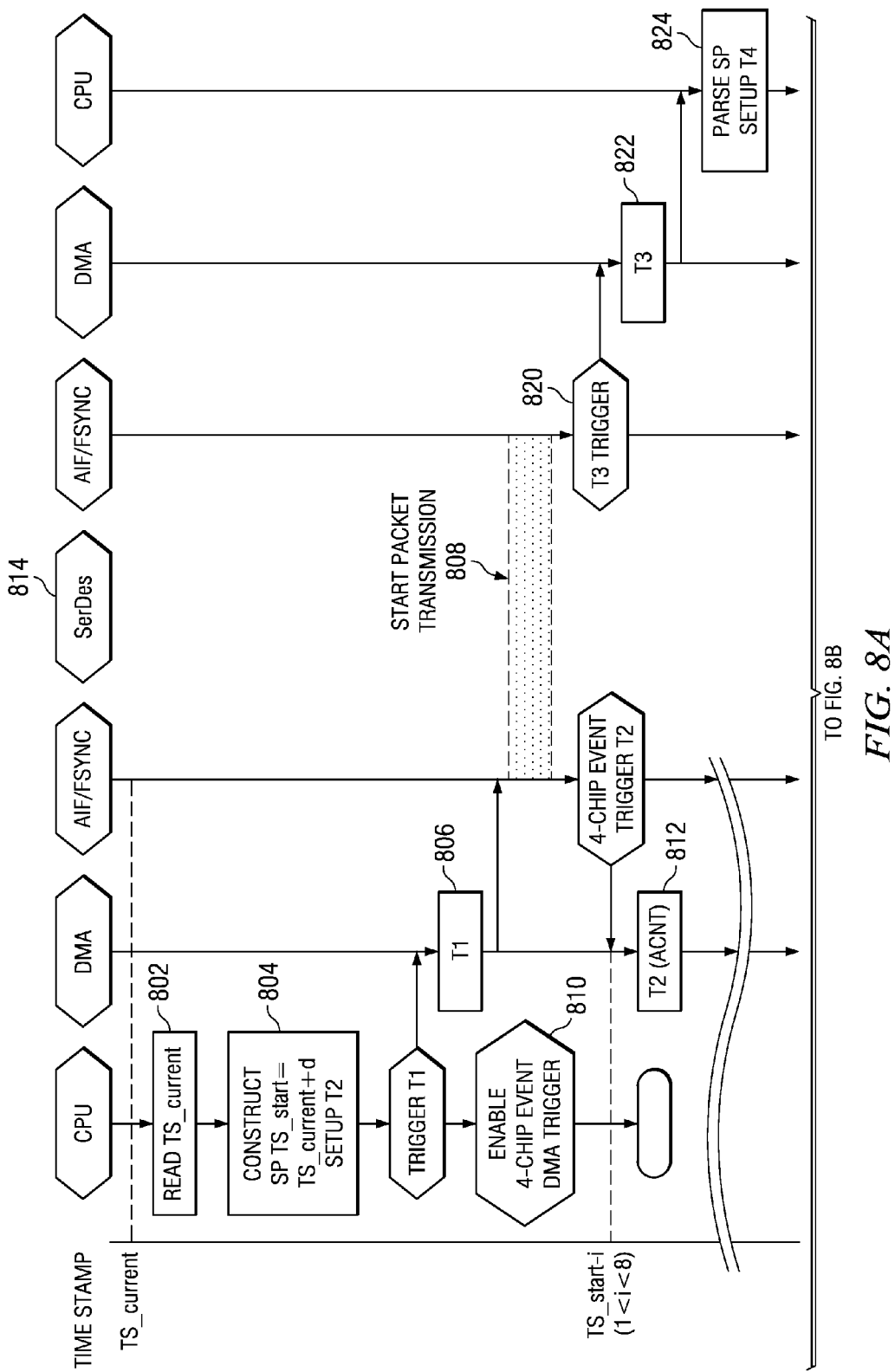
FIG. 8 is a timing diagram illustrating transmission of a data burst over a constant data rate channel.

FIG. 8 is a timing diagram illustrating transmission of a data burst over a constant data rate channel. Once an application that is executing on one of the DSP CPU cores makes a request for sending a block of data, the following sequence of events takes place at the transmitter. The CPU determines at step 802 when data transmission needs to start, based on the current value of the time stamp contained in a counter which increments once every 4 chips. Assume the current time stamp is TS_current. The actual burst transmission is configured to start at the next time stamp, i.e. TS_start=TS_current+1, to allow time for the CPU to configure the DMA. The TS_start value is transmitted to the receiver via the Start Packet.

The CPU constructs at step 804 the Start Packet and sets up a non-synchronized, one-shot DMA transfer at step 806 of the start packet to the TX FIFO. The Start Packet is transmitted at step 808 at the next opportunity as a packet switched message, as described earlier.

The CPU configures the DMA 206 to copy the data burst to be transmitted from DSP memory to the AIF TX RAM, starting at a location in AIF TX RAM corresponding to timestamp TS_start. The DMA channel is synchronized to the 4-chip FSYNC event, transferring at step 812 one time stamp worth of data (count ACNT=256 bytes) for each sync event. The 4-chip event is enabled at step 810 as soon as the transfer is configured. Because the AIF is taking data from the TX RAM location corresponding to the current time stamp to place it on the SerDes bus, and because eight time stamps worth of data are stored in the AIF RAM it is important that the DMA transfer into location corresponding to TS_start completes before the local time stamp reaches TS_start.

As the contents of the circular buffer are transmitted in the normal course of operation across the ser/des interface 814, the data burst will be transmitted at step 816 as part of the continuous stream of data from the circular buffer. Other than the start packet and the data burst, any other data in the circular buffer that was initially there and was not overwritten by the DMA transfer of the data burst is dummy data that accepted into the RX RAM by the receiver but is then ignored, such that processing load on the receiving system is minimized.

In the mean time, the receiver which is in another SOC IC device has set up its AIF link to be up and running, and dummy data is continuously being received from the physical link but not consuming any resources outside of AIF. When the start packet at step 808 arrives in one of the AIF RX FIFOs, the following sequence of events takes place. An event at step 820 is generated by hardware which is used to trigger a DMA transfer at step 822 from the RX FIFO to DSP memory. The completion of this DMA transfer in turns interrupts the CPU at step 824.

The CPU parses the Start Packet at step 824 to determine the location of the data burst in the AIF RX RAM based on TS_start and Links, size and the desired destination address. The CPU reads the local time stamp to make sure that it does not exceed TS_start+7, i.e. that it is not too late to receive the data. The CPU then configures the DMA. The CPU waits at step 826 for the appropriate time to enable at step 828 the 4-chip DMA synchronization event. Because the AIF RX RAM is being written to as the data is received over the SerDes bus, it is important that the DMA does not start reading too soon from the AIF RX RAM location corresponding to TS_start, otherwise old dummy data will be read, and it should not start reading too late, otherwise data will be lost. The EDMA should start no sooner than when local time stamp reaches TS_start+1, and no later than the time when the local time stamp reaches TS_start+7.

Figure 9:
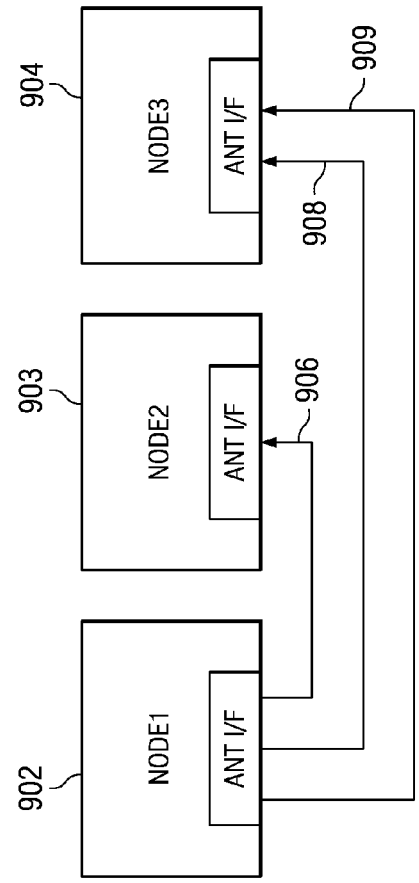
FIG. 9 is a block diagram illustrating point to multi-point transmission of data bursts via the constant data rate channels of the system of FIG. 2.

FIG. 9 is a block diagram illustrating point-to-point and point-to-multipoint transmission of data bursts via the constant data rate channels of the system of FIG. 2. As mentioned with regard to FIG. 2, the AIF interface 208 consists of six independent antenna stream links 210. For the purpose of the embodiment described herein, each of these links is treated as a different point-to-point connection that is initialized and used in its own context. This allows various topologies to be created. For example, in a system with two nodes, such as exemplary nodes 902 and 903, point-to-point communication is performed via link 906 using the data burst mechanism over an antenna stream mechanism as described above.

In a system with three or more nodes, such as exemplary nodes 902, 903 and 904, Node 902 may perform point-to-multipoint data burst communication over antenna stream links 906 and 908 to Nodes 903 and 904 respectively, for example. Furthermore, more than one link may be configured between two nodes, such as links 908 and 909 between nodes 902 and 904, in order to increase available bandwidth. The same control message with the same time stamp may be sent to Nodes 902 and 903, since the continuous data streams are formed in a parallel manner from parallel circular buffer regions.

Other Embodiments

Various other embodiments of the invention will be apparent to persons skilled in the art upon reference to this description. Embodiments of the invention are by no means restricted to the particular SOC described in some detail herein. For example, an embodiment may be based upon other types of constant data rate communication links which provide stream oriented communications in which a control message can indicate a beginning point for a data burst which is embedded in a continuous stream of data.

In another embodiment, the control message which indicates a starting position for the data burst may be transmitted on a separate communication channel rather than being embedded in the continuous stream of data on the constant data rate communication link.

In another embodiment, the control message may indicate a position of the data burst relevant to a marker within the continuous stream of data, rather than to a position in the circular transceiver buffers. For example, the marker may be a periodic synchronization pulse and the control message may indicate a displacement from a sync pulse.

In another embodiment, the constant data rate communication link may be serial, parallel, hardwired, optic, radio or other means for transferring a continuous stream of data.

The term "circuit switched" does not require actual switching of the circuit. It merely implies that a given communication link is connected, at least for a period of time, between two nodes for the purpose of transmitting a continuous stream of data.

As used herein, the terms "applied," "coupled," "connected," and "connection" mean electrically connected, including where additional elements may be in the electrical connection path. "Associated" means a controlling relationship, such as a memory resource that is controlled by an associated port. While the invention has been described with reference to illustrative embodiments, this description is not intended to be construed in a limiting sense.

It is therefore contemplated that the appended claims will cover any such modifications of the embodiments as fall within the true scope and spirit of the invention.

What is claimed is:

1. A method for transmitting a data burst comprising:
continuously transmitting data including
initially storing dummy data memory locations within a circular buffer,
circularly accessing memory locations within the circular buffer,
recalling data stored at the circularly accessed location, and
transmitting the recalled data via a communication channel;
upon determination to transmit a data burst
transmitting a control message indicating a start time for a data burst and a length of the data burst including
determining a time when transmission of the data burst should start,
forming the control message having a start time corresponding to the predetermined time, and
storing the control message in the circular buffer, and
upon reaching the start time indicated in the control message transmitting a data burst having a length indicated in the control message.

2. The method of claim 1, wherein:
said step of transmitting a data burst further includes
storing the data burst in the circular buffer starting at a location corresponding to the determined predetermined time when transmission of the data burst should start.

3. The method of claim 1, wherein:
the control message includes
a first set of unique bits denoting a control message,
a second set of bits denoting the start time,
a third set of bits denoting the data burst length, and
a fourth set of bits denoting a destination for the data burst.

4. A method of receiving data comprising the steps of:
continuously receiving data including writing received data in a next location of a circularly accessed circular buffer;
determining whether a control message indicating a predetermined time when transmission of a data burst starts and a length of the data burst is received in the continuously received data;
if a control message is received
determining from the control message the predetermined time and the length of the data burst, and
storing data from the continuously received data from the predetermined time for a length of time corresponding to the length of the data burst including transferring data from the circular buffer to a memory from a location in the circular buffer corresponding to the predetermined time for a number of locations in the circular buffer corresponding to the length of time; and
if a control message is not received discarding and not storing data from the continuously received data including circularly overwriting the discarded and not stored data in the circular buffer.

5. A method of receiving data comprising the steps of:
continuously receiving data;
determining whether a control message indicating a predetermined time when transmission of a data burst starts, a length of the data burst and a destination for the data burst is received in the continuously received data;
if a control message is received,
determining from the control message the predetermined time and the length of the data burst, and
storing data from the continuously received data from the predetermined time for a length of time corresponding to the length of the data burst including
if the destination of the control messages matches a predetermined destination, storing data from the continuously received data from the predetermined time for a length of time corresponding to the length of the data burst, and
if the destination of the control messages does not match a predetermined destination, discarding and not storing data from the continuously received data; and
if a control message is not received, discarding and not storing data from the continuously received data.

6. A digital system for transmitting data bursts from a first node, the first node comprising:
- a first memory circuit storing a data burst;
- a second memory circuit with a circular buffer region having circularly accessed memory locations initially storing dummy data;
- a communications link;
- a transmitter coupled to said circular buffer region of said second memory circuit and having an output for connection to said communication link, the transmitter operable to
  - circularly access memory locations of said circular buffer region to recall data, and
  - transmit recalled data on said communication link;
- a data processing circuit connected to said first memory and said second memory, said data processing circuit operable to
  - determine when to transmit a data burst,
  - upon determination to transmit a data burst
    - forming a control message indicating when to start said data burst and a length of said data burst,
    - storing said control message to said circular buffer region of said second memory, and
    - transferring a data burst from said first memory to said circular buffer region of said second memory at a memory location corresponding to the predetermined time when transmission of the data burst should start.

7. The system of claim 6, further comprising a second node, the second node comprising:
- a third memory circuit;
- a fourth memory circuit with a circular buffer region having circularly accessed memory locations;
- a receiver coupled to said communication link operable to receive the continuous stream of data from the communications link and store received data in a next circularly accessed memory location of said circular buffer region of said fourth memory; and
- a second data processing circuit connected to said third memory, said fourth memory and said receiver, said second data processing circuit operable to
  - determine whether a control message is received,
  - if a control message is received
    - determining from the control message when to start a data burst and a length of a data burst, and
    - transferring data from said circular buffer region of said fourth memory data from a memory location corresponding to said predetermined time when to start said data burst for a number of memory locations corresponding to said length of said data burst; and
  - if a control message is not received permitting said receiver to overwrite and discard data from said communications link.

8. The system of claim 7, wherein:
- said control message further indicates a destination for said data burst;
- said second processing circuit is further operable to
  - if said destination of said control message matches a predetermined destination corresponding to said second node transferring data from said circular buffer region of said fourth memory data from a location corresponding to said predetermined time when to start said data burst for a number of memory locations corresponding to said length of said data burst, and
  - if said destination of said control messages does not match said predetermined destination permitting said receiver to overwrite and discard data from said communications link.

* * * * *